(12) United States Patent
Song et al.

(10) Patent No.: US 11,080,930 B2
(45) Date of Patent: Aug. 3, 2021

(54) VIRTUAL REALITY CONTROL SYSTEM

(71) Applicant: SKONEC ENTERTAINMENT CO., LTD., Seoul (KR)

(72) Inventors: Chae Hoon Song, Seoul (KR); Se Ho Kang, Seoul (KR)

(73) Assignee: SKONEC ENTERTAINMENT CO., LTD., Seoul (KR)

( * ) Notice: Subject to any disclaimer, the term of this patent is extended or adjusted under 35 U.S.C. 154(b) by 0 days.

(21) Appl. No.: 16/661,268

(22) Filed: Oct. 23, 2019

(65) Prior Publication Data

US 2021/0125408 A1 Apr. 29, 2021

(30) Foreign Application Priority Data

Oct. 23, 2019 (KR) .................. 10-2019-0132026

(51) Int. Cl.
*G06T 19/00* (2011.01)
*G09G 5/36* (2006.01)

(52) U.S. Cl.
CPC ........... *G06T 19/003* (2013.01); *G09G 5/363* (2013.01); *G09G 2354/00* (2013.01)

(58) Field of Classification Search
CPC ... G06T 19/003; G09G 5/363; G09G 2354/00
See application file for complete search history.

(56) References Cited

U.S. PATENT DOCUMENTS

| | | | |
|---|---|---|---|
| 2014/0336786 A1* | 11/2014 | Asenjo ................... | G06F 3/048 700/17 |
| 2015/0116316 A1* | 4/2015 | Fitzgerald ............ | G02B 27/017 345/419 |
| 2015/0269818 A1* | 9/2015 | Jain ..................... | G08B 13/2488 340/572.1 |
| 2016/0335602 A1* | 11/2016 | Kariv ................. | G06Q 10/0635 |
| 2017/0193705 A1* | 7/2017 | Mullins ................. | G06T 19/006 |
| 2020/0117900 A1* | 4/2020 | Deng ..................... | H04W 4/02 |
| 2020/0330870 A1* | 10/2020 | Sun ..................... | A63F 13/5375 |

* cited by examiner

*Primary Examiner* — William A Beutel
(74) *Attorney, Agent, or Firm* — Maschoff Brennan

(57) ABSTRACT

According to one aspect of the present disclosure, a virtual reality control system includes at least one controller configured to control at least one of the first display and the second display, the controller is configured to acquire first position data related to the first user and second position data related to the second user, and output an image including a first area and a second area to the first display on the basis of the first position data, if the first user has a first authority, the second user has a second authority and the first authority is a higher authority than the second authority, the first image is output to the first display when the first position data is located in the first area, and a notification image is output to the second display when the second position data is located in the first area.

6 Claims, 17 Drawing Sheets

VIRTUAL REALITY CONTROL SYSTEM

CROSS-REFERENCE TO RELATED APPLICATION

This application claims priority to and the benefit of Korean Patent Application No. 10-2019-0132026 filed on Oct. 23, 2019, the disclosure of which is incorporated herein by reference in its entirety.

BACKGROUND

1. Field of the Invention

The present disclosure relates to a virtual reality control system.

2. Discussion of Related Art

Virtual reality may be a technology that provides a user with virtual information added to reality or with a state of a target object in the real world as a virtual reality image generated by a program.

Such a technology for providing a virtual reality may include a technology that creates a virtual space, a virtual character, and a virtual object using a program on the basis of information provided in the real world regarding a state of the target object such as a user or an object. In this technology, information on the state of the target object may be acquired using various sensors.

Various disaster situations may be provided to the user using the virtual reality system, and research on methods for improving the feeling of immersion for a user who is experiencing a virtual reality has been actively conducted.

SUMMARY OF THE INVENTION

One object of the present disclosure is to provide a virtual reality system which assigns a different role to a user according to authority in chemical accident response training content, thereby enabling the user to perform appropriate training.

According to one general aspect of the present disclosure, there is provided a virtual reality control system including a sensor configured to emit and receive light on and from a target object and detect a light signal; a first display configured to output an image to a first user; a second display configured to output an image to a second user; and at least one controller configured to control at least one of the first display and the second display, wherein the controller is configured to acquire first position data related to the first user and second position data related to the second user on the basis of the light signal and output an image including a first area and a second area to the first display on the basis of the first position data, wherein the first user has a first authority, the second user has a second authority, the first image is output when the first authority is a higher authority than the second authority and when the first position data is located in the first area, and a notification image is output to the second display when the second position data is located in the first area.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
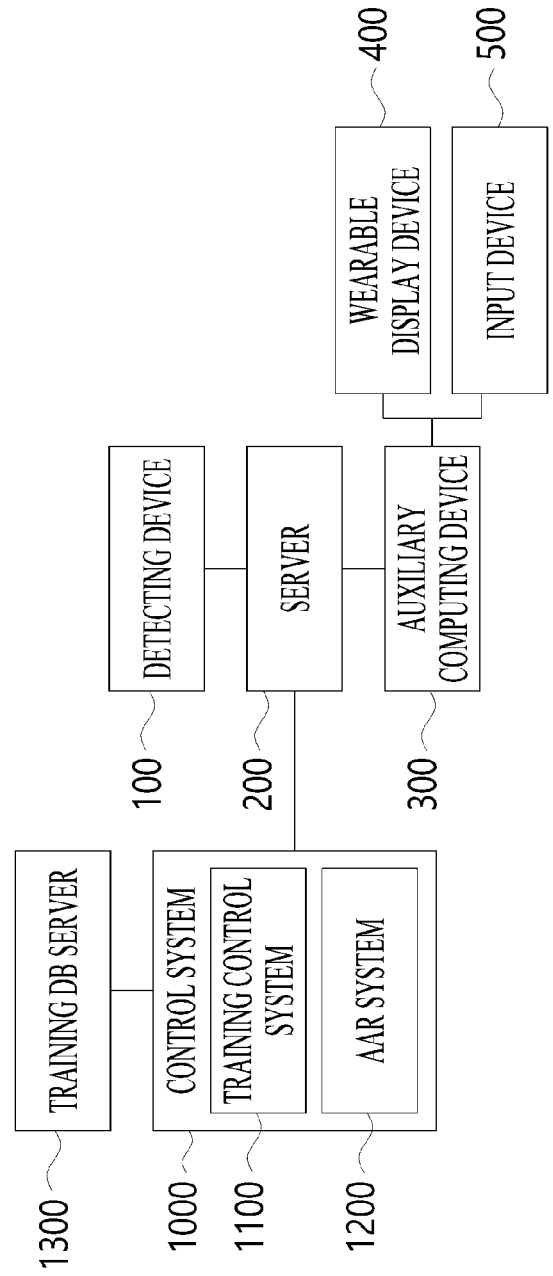
FIG. 1 is a diagram illustrating a virtual reality control system according to one embodiment of the present disclosure.

A virtual reality control system according to one embodiment may include a sensor configured to emit and receive light on and from a target object and detect a light signal; a first display configured to output an image to a first user; a second display configured to output an image to a second user; and at least one controller configured to control at least one of the first display and the second display, wherein the controller is configured to acquire first position data related to the first user and second position data related to the second user on the basis of the light signal and output an image including a first area and a second area to the first display on the basis of the first position data, wherein the first user has a first authority, the second user has a second authority, the first image is output when the first authority is a higher authority than the second authority and when the first position data is located in the first area, and a notification image is output to the second display when the second position data is located in the first area.

The notification image may not be an image that corresponds to a field of view of the second user.

When the second user has the first authority transferred by the first user, an image that corresponds to a field of view of the second user may be output when the second position data is located in the first area.

The first authority and the second authority may be preset authorities.

The controller may assign a higher authority to a user who is located first in the first area between the first and second users.

A simulation may be executed with a different scenario according to the first authority and the second authority.

Evaluation may be performed with a different evaluation item according to the first authority and the second authority.

The controller may display a moving path for each of the first user and the second users to move in each of the first display and the second display according to the first authority and the second authority.

The controller may display a moving path toward a destination to each of the first display, and the second display and the moving path is not the shortest distance.

The controller may display a moving path toward a destination in each of the first display, and the second display and the controller controls the moving path of the second user to be displayed after movement of the first user is completed.

Hereinafter, exemplary embodiments of the present disclosure will be described in detail with reference to the accompanying drawings. Meanwhile, the spirit of the present disclosure is not limited to the suggested embodiments, and those skilled in the art to which the present disclosure pertains could easily suggest a further retrogressive disclosure or another embodiment which falls within the spirit of the present disclosure through the addition, modification, and deletion of another component without departing from the spirit of the present disclosure.

In the following description, components having the same function within the same scope illustrated in the drawings of the embodiments are illustrated using the same reference numerals.

The present disclosure relates to a virtual reality control system which may provide a virtual reality so that a user can experience a situation that is difficult to experience due to space and time constraints or limitations of implementation or occurrence.

Here, the virtual reality may be different from the real world and may be an artificial environment created by a program.

Such virtual reality may be generally classified into a virtual reality (VR) that creates a virtual space separated from reality using a program and provides an image of the virtual space, an augmented reality (AR) that provides a single image by superimposing virtual images on the real world, and a mixed reality (MR) that provides a virtual space by fusing the real world and a virtual reality and provides an image of the virtual space.

In describing virtual reality hereinafter, the virtual reality may refer to a virtual environment that provides various types of virtual spaces, as well as the above-described VR, AR, and MR.

Hereinafter, a virtual reality control system 10 for providing virtual reality according to one embodiment of the present disclosure will be described with reference to FIG. 1.

FIG. 1 is a diagram illustrating a virtual reality control system 10 according to one embodiment of the present disclosure.

Referring to FIG. 1, the virtual reality control system may include a detecting device 100, a server 200, an auxiliary computing device 300, a wearable display device 400, an input device 500, a control system 1000, and a training database (DB) server 1300.

According to one embodiment, the detecting device 100 may be connected to the server 200.

The detecting device 100 may acquire data detected by tracking a target object.

The target object according to one embodiment may be an object that affects an image output through the wearable display device 400. For example, the target object may include at least one of objects having a reference point or a characteristic point, such as the wearable display device 400, a user, the input device 500, and objects located near the user.

In addition, the tracking of the target object according to one embodiment may mean acquiring data on a position of the target object in the reality environment.

For example, by tracking the target object, data on a position that changes according to movement of the target object in the reality environment may be acquired. The position data of the target object may be acquired at predetermined intervals but is not limited thereto.

According to one embodiment, the detecting device 100 may provide the detecting data to the server 200.

According to one embodiment, the server 200 may be connected to the detecting device 100 and the auxiliary computing device 300.

The server 200 may acquire data from the devices connected thereto.

According to one embodiment, the server 200 may acquire at least one of detecting data, image data acquired by the detecting device 100, and state data of the detecting device 100 from the detecting device 100.

In addition, the server 200 may acquire a variety of data according to some embodiments described below.

According to one embodiment, the server 200 may control the devices connected thereto.

According to one embodiment, the server 200 may control the auxiliary computing device 300 or the wearable display device 400.

In one example, the server 200 may control driving a program or application installed in the auxiliary computing device 300. More specifically, the server 200 may control start and/or termination of the program or application installed in the auxiliary computing device 300.

In another example, the server 200 may provide various settings necessary for operation of the detecting device 100.

In addition, the server 200 may generate position data of the target object or generate virtual position data corresponding to a position of the target object in a virtual reality on the basis of the detecting data.

Also, the server 200 may perform authentication of the program or application executed in the auxiliary computing device 300.

The functions of the server 200 according to one embodiment are not limited to the above-described functions, and the server 200 that performs various functions may be provided according to some embodiments.

In addition, the server 200 according to one embodiment is not necessarily provided as a single physical device and may be provided as a plurality of devices that perform individual functions which are subdivided from the above-described functions.

For example, the server 200 may be divided into a detecting server connected to the detecting device 100 and configured to acquire position data on the basis of the detecting data, an operation server configured to control some of the devices provided to the system, and a license server configured to perform authentication of a program or application executed in at least one device among the devices of the virtual reality control system 10, and relevant functions may be performed by the respective servers.

Meanwhile, the server 200 may be provided with an input signal acquired by the auxiliary computing device 300 from the input device 500 or input data based on the input signal.

The input data may include selection data of the user regarding an object or the like, data related to a motion input via the input device 500, and aiming data related to an aiming direction of the input device 500.

The auxiliary computing device 300 may be connected to at least one of the detecting device 100, the server 200, the wearable display device 400, and the input device 500.

Also, the auxiliary computing device 300 may be connected to the control system 1000.

The auxiliary computing device 300 may calculate virtual position data on the basis of the position data acquired from the server 200.

Alternatively, the auxiliary computing device 300 may calculate the position data of the target object or calculate the virtual position data by processing the detecting data acquired from the detecting device 100.

The auxiliary computing device 300 may provide an image to the user via the wearable display device 400 through a pre-stored program or application.

In addition, the auxiliary computing device 300 may provide sound data to be provided via the wearable display device 400.

According to one embodiment, the auxiliary computing device 300 may acquire an image to be provided to the user on the basis of the position data through a pre-installed program or application.

In addition, the auxiliary computing device 300 may acquire input data on the basis of the input signal acquired from the input device 500.

In addition, the auxiliary computing device 300 may acquire an image to be provided to the user by taking into account the acquired input data.

The wearable display device 400 may be connected to the auxiliary computing device 300.

The wearable display device 400 may provide an image of a virtual reality to the user.

The wearable display device 400 may visually output the virtual reality image acquired from the auxiliary computing device 300 to the user.

In addition, the wearable display device 400 may output the sound data acquired from the auxiliary computing device 300.

The input device 500 may acquire a signal related to an input of a user which will be reflected in the virtual reality.

The input device 500 may be connected to the auxiliary computing device 300.

The input device 500 may provide an input signal that corresponds to the input of the user to the auxiliary computing device 300.

The input device 500 may include an acceleration sensor, a gyroscope, a gyro sensor, Micro Electro Mechanical Systems (MEMS), a geomagnetic sensor, an inertial measurement sensor (IMIU), an optical sensor, an illuminance sensor, a photo sensor, an infrared sensor, a color sensor, a depth sensor, an electromagnetic wave sensor, and the like for acquiring a signal corresponding to movement of the user.

In addition, the input device 500 may include a button, a switch, a jog shuttle, a wheel, and the like for acquiring a signal related to the userr, an inertialln addition, the input device 500 may be connected to the auxiliary computing device 300 through at least one of wired communication and wireless communication.

Also, the input device 500 may include a communication module for communicating with the auxiliary computing device 300.

The control system 1000 may be connected to the server 200. Alternatively, the control system 1000 may be connected to the auxiliary computing device 300. The control system 1000 may be a component included in the server 200. The control system 1000 may be provided with an interface that allows external personnel to control training.

The control system 1000 may include a training control system 1100 and an after-action-review (AAR) system 1200.

The training control system 1100 may be a system for allowing external personnel, such as a supervisor, to set a training situation and for proceeding with the training situation. The training control system 1100 may control at least one of the auxiliary computing device 300 and the server 200 so that the user may conduct training on the basis of the training situation set by the external personnel.

The AAR system 1200 may store training process and result data therein. The AAR system 1200 may provide content to the user to review on the basis of the stored training data. The AAR system 1200 may evaluate trainees and provide evaluation results to the user.

The training DB server 1300 may store training scenarios therein. The control system 1000 may load stored data of the training DB server 1300 to control at least one of the server 200 and the auxiliary computing device 300, thereby enabling the user to conduct training.

The training DB server 1300 may store user data and training data, which is generated during the training process, therein.

The training DB server 1300 may be implemented as a server separate from the control system 1000 or may be implemented as a part of the control system 1000. Also, the control system 1000 and the training DB server 1300 may be implemented as a part of the server 200.

FIG. 1 illustrates that the input device 500 is connected to the auxiliary computing device 300, but the embodiment is not limited thereto, and the input device 500 may be provided in various connection forms according to the selection.

For example, the input device 500 may be connected to the server 200 and the wearable display device 400 and provide an input signal thereto.

The above-described virtual reality control system 10 is merely an example for convenience of description. The virtual reality control system 10 according to one embodiment is not limited to the configuration and connection relationship shown in FIG. 1 and may be provided in various forms according to the selection.

In one example, the auxiliary computing device 300 and the wearable display device 400 may be provided as one device, and in this case, operations performed in the auxiliary computing device 300 may be implemented in the wearable display device 400.

However, in the following description of the various embodiments, the virtual reality control system 10 will be described as an example for convenience of description.

Hereinafter, a detecting device 100 according to one embodiment of the present disclosure will be described with reference to FIG. 2.

Figure 2:
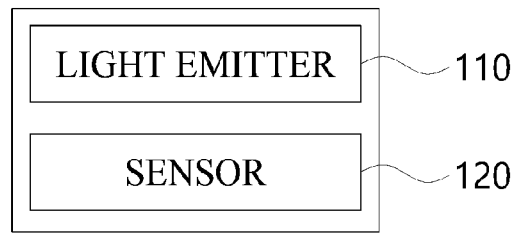
FIG. 2 is a diagram illustrating a detecting device according to one embodiment of the present disclosure.

FIG. 2 is a diagram illustrating a detecting device according to one embodiment of the present disclosure.

Referring to FIG. 2, the detecting device 100 may include a light emitter 110 and a sensor 120.

The light emitter 110 may project a signal to the target object or to the vicinity of the target object for tracking.

In one example, the light emitter 110 may be provided as a light-emitting device that projects an optical signal such as visible light, infrared light, or the like.

More specifically, the light emitter may be provided as a visible-light light emitting diode (LED), an infrared LED, or the like.

The sensor 120 may acquire a signal from an external source.

In one example, the sensor 120 may acquire a signal corresponding to the signal projected from the light emitter 110.

In another example, the sensor 120 may acquire a signal related to light reflected by a marker provided on the target object.

For example, the sensor 120 may be provided as an image sensor, an optical sensor, an illuminance sensor, a photo sensor, an infrared sensor, a color sensor, a depth sensor, an electromagnetic wave sensor, or the like.

Figure 3:
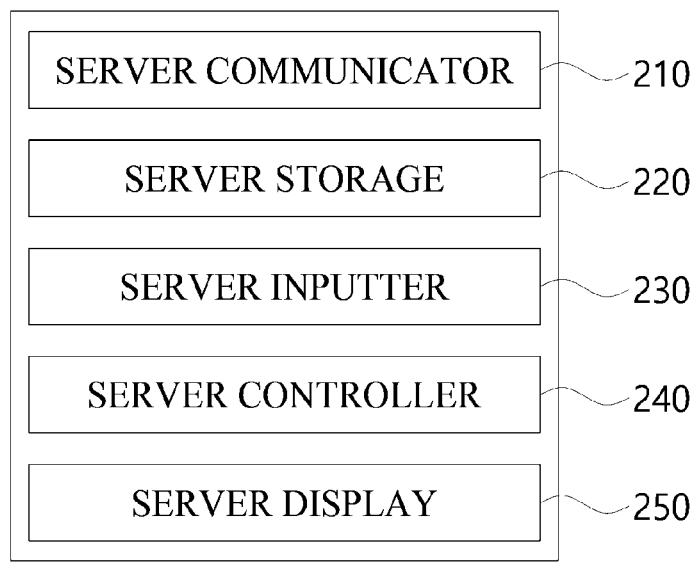
FIG. 3 is a diagram illustrating a server according to one embodiment of the present disclosure.

FIG. 3 is a diagram illustrating a server 200 according to one embodiment of the present disclosure.

Referring to FIG. 3, the server 200 may include a server communicator 210, a server storage 220, a server inputter 230, a server controller 240, and a server display 250.

The server communicator 210 may be connected to at least one of the detecting device 100, the auxiliary computing device 300, the wearable display device 400, and the input device 500 to acquire or provide data therefrom or thereto.

The server communicator 210 may be connected to at least one of the detecting device 100, the auxiliary computing device 300, the wearable display device 400, and the input device 500 through at least one of wired communication and wireless communication.

For example, the wireless communication may include a mobile communication network, such as a Wi-Fi network, a 3rd generation (3G) network, a long-term evolution (LTE) network, a 5G network, and Long Range (LoRA), wireless access in vehicular environment (WAVE), beacon, ZigBee, Bluetooth, Bluetooth low energy, or the like.

In addition, the wired communication may include a twisted-pair cable, a coaxial cable, an optical fiber cable, or the like.

The server communicator 210 may be provided as a communication module for providing at least one of the wired communication and the wireless communication.

The server storage 220 may store data therein.

The server storage 220 may store data acquired from an external source.

In addition, the server storage 220 may store data necessary for operation of the server 200.

For example, the server storage 220 may be provided as a hard disk, a floppy disk, a magnetic medium, such as magnetic tape, an optical medium, such as a compact disc read only memory (CD-ROM), a digital versatile disc, or the like, a magneto-optical medium, such as a floptical disk, a read only memory (ROM), a random access memory (RAM), a flash memory, a solid state drive (SSD), a CD-ROM, a DVD-ROM, a Universal Serial Bus (USB), or the like.

The server inputter 230 may acquire a signal corresponding to an input of the user.

The input of the user may be, for example, a press, a click, a touch, or a drag of a button.

The server inputter 230 may be implemented as, for example, a keyboard, a key pad, a jog shuttle, or a wheel.

The server controller 240 may control an overall operation of the server 200.

For example, the server controller 240 may control the operation of a device included in the server 200.

The server display 250 may output visual data.

The server display 250 may be provided as a monitor, a TV, a display panel, or the like, which outputs visual data.

In addition, when the server display 250 is provided as a touch screen, the server display 250 may perform a function of the server inputter 230.

Figure 4:
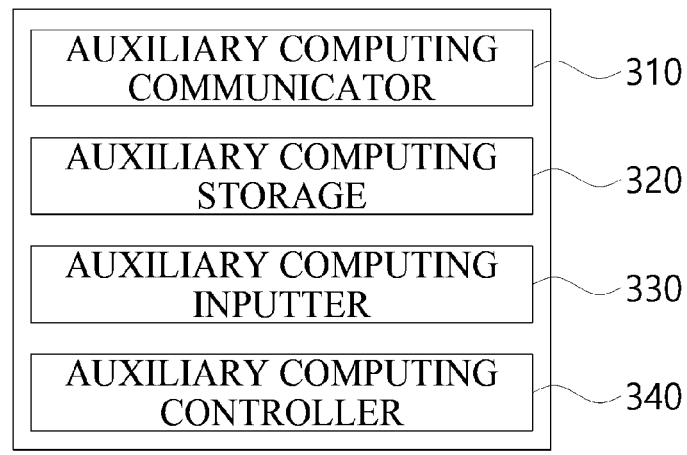
FIG. 4 is a diagram illustrating an auxiliary computing device according to one embodiment of the present disclosure.

FIG. 4 is a diagram illustrating an auxiliary computing device 300 according to one embodiment of the present disclosure.

Referring to FIG. 4, the auxiliary computing device 300 may include an auxiliary computing communicator 310, an auxiliary computing storage 320, an auxiliary computing inputter 330, and an auxiliary computing controller 340.

The auxiliary computing communicator 310 may be connected to at least one of the server 200, the wearable display device 400, and the input device 500.

The auxiliary computing communicator 310 may be connected to at least one of the server 200, the wearable display device 400 and the input device 500 through at least one of wired communication and wireless communication.

The auxiliary computing communicator 310 may exchange data with at least one of the connected server 200, the connected wearable display device, and the connected input device 500.

For example, the wireless communication may include a mobile communication network, such as a Wi-Fi network, a 3G network, an LTE network, a 5G network, and LoRA, WAVE, beacon, ZigBee, Bluetooth, Bluetooth low energy, and the like.

In addition, the wired communication may include a twisted-pair cable, a coaxial cable, an optical fiber cable, or the like.

The auxiliary computing communicator 310 may be provided as a communication module for providing at least one of the wired communication and the wireless communication.

The auxiliary computing storage 320 may store data acquired from an external source.

In addition, the auxiliary computing storage 320 may store data necessary for operation of the auxiliary computing device 300.

Also, the auxiliary computing storage 320 may store therein an application or program therein to provide a virtual experience to the user.

The auxiliary computing inputter 330 may acquire a signal corresponding to an input of the user.

The input of the user may be, for example, a press, a click, a touch, or a drag of a button.

For example, the auxiliary computing inputter 330 may be implemented as, for example, a keyboard, a key pad, a jog shuttle, or a wheel.

The auxiliary computing controller 340 may control an overall operation of the auxiliary computing device 300.

Figure 5:
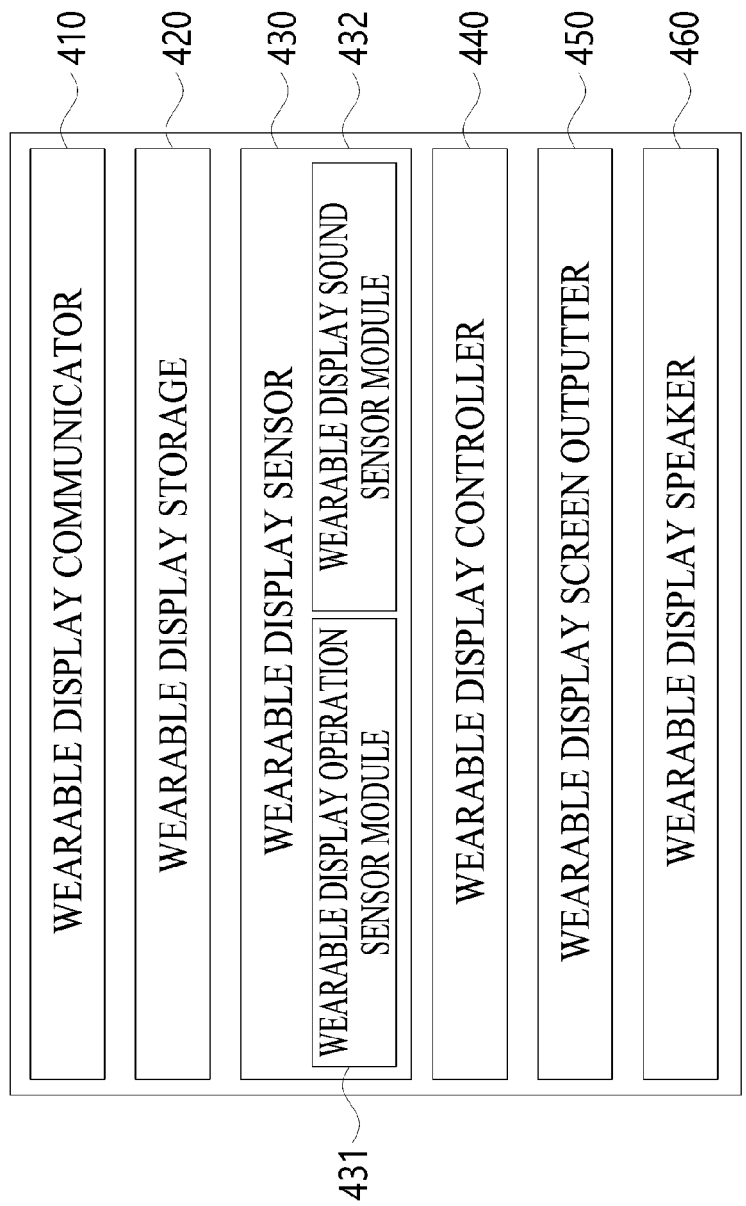
FIG. 5 is a diagram illustrating a wearable display device according to one embodiment of the present disclosure.

FIG. 5 is a diagram illustrating a wearable display device 400 according to one embodiment of the present disclosure.

Referring to FIG. 5, the wearable display device 400 may include a wearable display communicator 410, a wearable display storage 420, a wearable display sensor 430, a wearable display controller 440, a wearable display screen outputter 450, and a wearable display speaker 460.

The wearable display communicator 410 may be connected to the auxiliary computing device 300.

The wearable display communicator 410 may be connected to the auxiliary computing device 300 through at least one of wired communication and wireless communication.

The wearable display storage 420 may store data therein.

The wearable display storage 420 may store an application or program necessary for operation of the wearable display device 400.

In addition, the wearable display storage 420 may store data acquired from an external source.

The wearable display sensor 430 may acquire a state of the wearable display device 400 and a signal corresponding to an input of the user.

The wearable display sensor 430 according to one embodiment may include a wearable display operation sensor module 431 and a wearable display sound sensor module 432.

The wearable display operation sensor module 431 may acquire a signal related to a state of the wearable display device 400.

In one example, the wearable display operation sensor module 431 may acquire rotation data related to a rotation of the wearable display device 400.

In another example, the wearable display operation sensor module 431 may acquire movement data related to a position movement of the wearable display device 400.

The wearable display operation sensor module 431 may include an acceleration sensor, a gyroscope, a gyro sensor, MEMS, a geomagnetic sensor, an IMIU, an optical sensor, an illuminance sensor, a photo sensor, an infrared sensor, a color sensor, a depth sensor, an electromagnetic wave sensor, and the like.

The wearable display sound sensor module 432 may acquire a signal corresponding to a sound externally input.

In one example, the wearable display sound sensor module 432 may be a microphone.

The wearable display controller 440 may control an overall operation of the wearable display device 400.

The wearable display screen outputter 450 may output visual data to the user.

In one example, the wearable display screen outputter 450 may output an image of virtual reality. In another example, the wearable display screen outputter 450 may output an image of a three-dimensional (3D) virtual reality.

The wearable display screen outputter 450 may be provided as an image outputting device, such as a liquid crystal display (LCD), electronic paper, an LED display, organic light emitting diode (OLED) display, a curved display, a stereoscopy (a 3D display using binocular disparity), or the like.

The wearable display speaker 460 may output auditory data.

The wearable display speaker 460 may be provided as a sound device, such as a tuner, a player, an amplifier, a speaker, or the like.

Figure 6:
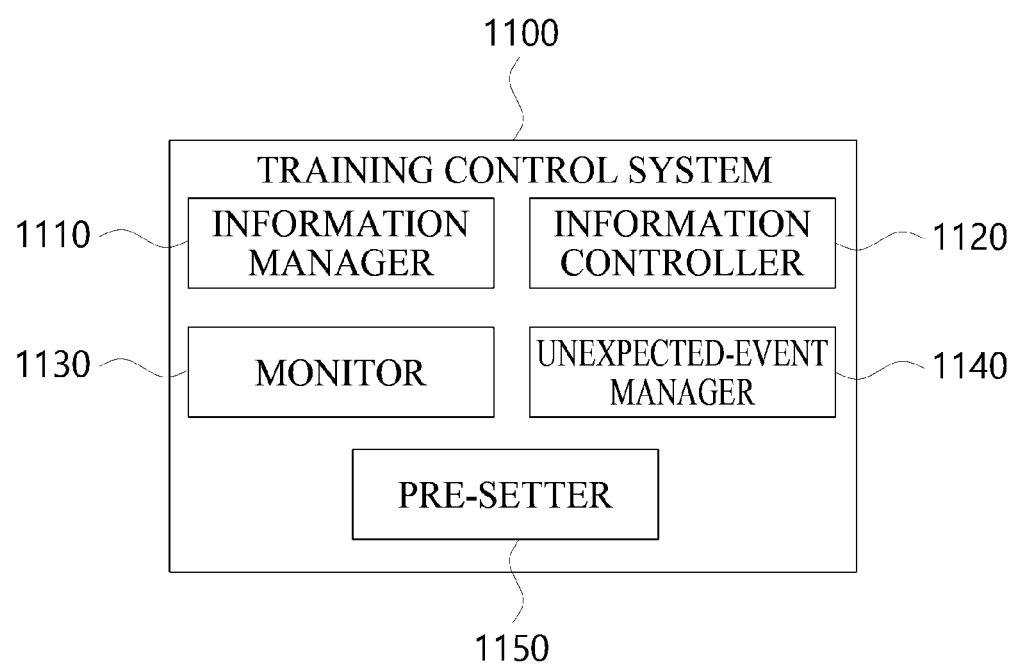
FIG. 6 is a diagram illustrating a training control system according to one embodiment of the present disclosure.

FIG. 6 is a diagram illustrating a training control system 1100 according to one embodiment of the present disclosure.

Referring to FIG. 6, the training control system 1100 according to one embodiment may include an information manager 1110, a training controller 1120, a monitor 1130, an unexpected-event manager 1140, and a pre-setter 1150.

The information manager 1110 may manage trainee information. The information manager 1110 may provide stored trainee information to a system administrator and a controller.

The information manager 1110 may set authorities of a plurality of trainees. For example, the information manager 1110 may set at least one of the plurality of trainees as a field commander and set the remaining trainees as team members. The information manager 1110 may set the plurality of trainees into multiple teams. The information manager 1110 may set the authority and role of each trainee on the basis of stored information on the trainees.

The training controller 1120 may control pre-setting and training regarding the training that the trainees will proceed with.

The training controller 1120 may set pre-setting, such as setting of a training scenario, trainee registration, and the like, before the trainees start training.

The training controller 1120 may assign a role to each trainee. The training controller 1120 may assign a role to each trainee on the basis of the authority set by the information manager 1110. The training controller 1120 may load the stored scenario or set a level of difficulty for training. The training controller 1120 may add or delete an arbitrary situation created in the training scenario. The training controller 1120 may control start, stop, and/or termination of the training.

The monitor 1130 may check a behavior of the trainee, a situation of a training field, progress of the scenario, a status of equipment, and the like in real time during the training.

The unexpected-event manager 1140 may apply an arbitrary situation to the trainee who is executing the training scenario. The unexpected-event manager 1140 may change the task and role of each trainee. The unexpected-event manager 1140 may delete the authority of the trainee with the highest authority among the plurality of trainees. In this case, an update may be made so that the trainee with the next highest authority can be assigned the highest authority. Alternatively, when the authority of the trainee with the highest authority among the trainees is deleted, a trainee closest to the corresponding trainee may be assigned the highest authority. Alternatively, when the authority of the trainee with the highest authority among the trainees is deleted, a trainee who first occupies an area that the corresponding trainee has occupied may be assigned the highest authority.

The unexpected-event manager 1140 may add and/or delete a virtual character, edit equipment of the trainee, or apply a plurality of events.

Figure 7:
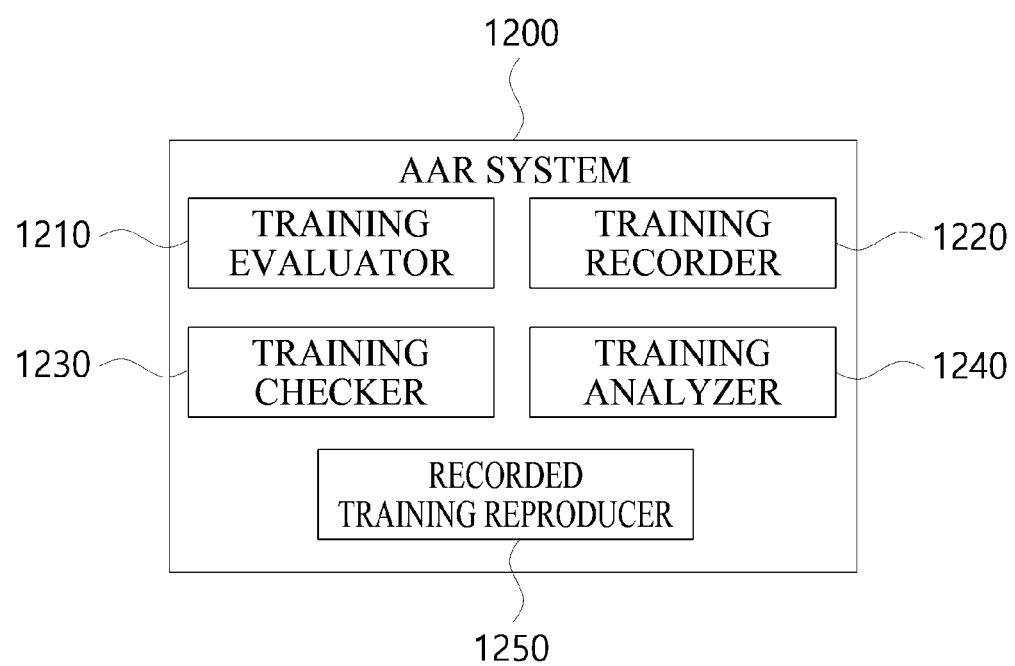
FIG. 7 is a diagram illustrating an after-action-review (AAR) system of a virtual reality control system according to one embodiment.

FIG. 7 is a diagram illustrating an AAR system of a virtual reality control system according to one embodiment.

Referring to FIG. 7, the AAR system 1200 according to one embodiment may include a training evaluator 1210, a training recorder 1220, a training checker 1230, a training analyzer 1240, and a recorded training reproducer 1250.

The training evaluator 1210 may evaluate a degree of progress regarding the trainee's attainment of task. The training evaluator 1210 may calculate an assessment score for each trainee. The training evaluator 1210 may calculate an assessment score for a team to which each trainee belongs or an overall assessment score for trainees who have executed the same scenario.

The training evaluator 1210 may detect location information of a trainee, determine a degree of similarity by comparing the location information and a path set in the scenario, and evaluate the training of the trainee. When an unexpected event occurs, the training evaluator 1210 may evaluate the training on the basis of the change in location information of the trainee. In particular, the training evaluator 1210 may evaluate the training by assigning a weight to a response speed of the trainee immediately after the occurrence of the unexpected event. The training evaluator 1210 may evaluate the posture of the trainee on the basis of the height of the trainee and the height of a marker at the time of movement. Also, the training evaluator 1210 may evaluate the trainee on the basis of the hand gesture of the trainee, a degree of mastery in handling a real object, and the like.

The training recorder 1220 may record training of each trainee. The training recorder 1220 may record the positions, postures, an action of the trainee, and positions of the real object during the training process. The training evaluator 1210 may evaluate the training of the trainee on the basis of the data recorded in the training recorder 1220.

The training checker 1230 may check stored training. The training checker 1230 may check a trainee-specific training result and a training team-specific training result by period or scenario.

The training analyzer 1240 may analyze executed training. The training analyzer 1240 may provide time-specific evaluation with a graph. The training analyzer 1240 may compare evaluation results between the plurality of trainees and provide the comparison result with a graph.

The recorded training reproducer 1240 may reproduce recorded training. The recorded training reproducer 1250 may re-output an image, which has been output to the wearable display device 400 for each trainee, through the wearable display device 400.

Here, the server 200, the auxiliary computing device 300, the control system 1000, and the training DB server 1300 of the virtual reality control system may be defined as a single controller. The components defined as a single controller may be implemented as a single device or cloud computing. The controller may be implemented as a micro-processor.

Figure 8:
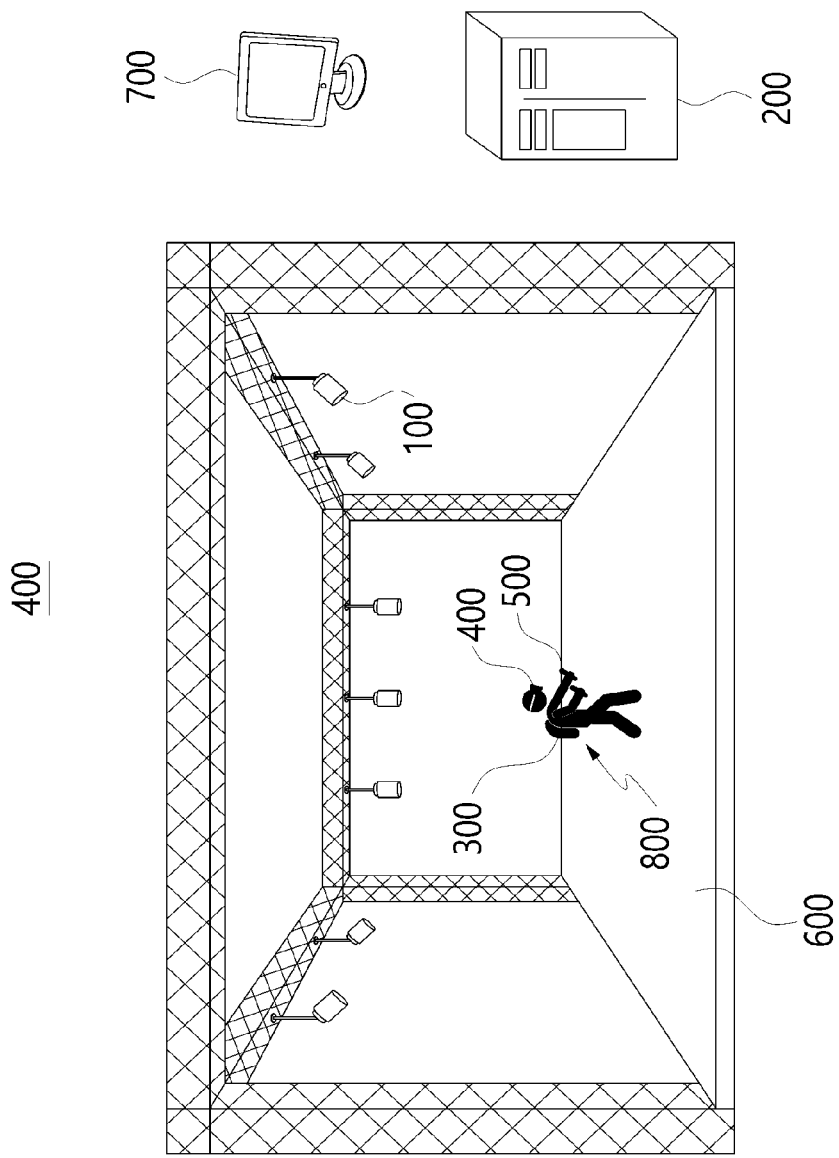
FIG. 8 is a diagram illustrating an implementation example of a virtual reality control system according to one embodiment of the present disclosure.

FIG. 8 is a diagram illustrating an implementation example of a virtual reality control system 10 according to one embodiment of the present disclosure.

Referring to FIG. 8, the virtual reality control system 10 may be implemented by providing at least one user 800 with a tracking area 600 for a virtual experience.

In addition, in the tracking area 600, the user 800 may be provided with at least one of an auxiliary computing device 300, a wearable display device 400, and an input device 500.

In addition, a target object to be provided to the user 800 may be provided with a marker M.

For example, when target objects are the wearable display device 400 and the input device 500, the wearable display device 400 and the input device 500 may be provided with markers M in different patterns.

A pattern in which the marker M is provided will be described below.

In addition, the tracking area 600 may be provided with at least one detecting device 100.

For example, as shown in FIG. 8, the tracking area 600 may be provided with a plurality of detecting devices 100.

The detecting devices 100 may be provided to be spaced apart from each other at predetermined intervals around the periphery of the tracking area 600.

In addition, the detecting devices 100 may be provided to be spaced apart from each other at a predetermined height from the ground.

In addition, the detecting devices 100 may be provided to be oriented toward the tracking area 600.

The detecting devices 100 may be fixedly installed on a pre-installed frame.

For example, as shown in FIG. 8, a frame for installing the detecting devices 100 may be provided around the tracking area 600. In addition, the detecting devices 100 may be fixedly installed on the frame.

The detecting devices 100 may acquire detecting data related to the tracking area 600.

A sensor 120 included in the detecting device 100 may acquire detecting data related to at least a part of the tracking area 600.

The detecting device 100 may provide the detecting data to a server 200 or an auxiliary computing device 300.

For example, the detecting device 100 may provide the detecting data acquired by the sensor 120 to the server 200.

The server 200 may acquire real-time position data of the target object on the basis of the detecting data.

As shown in FIG. 8, when the plurality of detecting devices 100 are provided in the tracking area 600, the server 200 or the auxiliary computing device 300 may acquire detecting data from the plurality of detecting devices 100, and acquire the current position data of the target object on the basis of the acquired detecting data.

In addition, the server 200 or the auxiliary computing device 300 may acquire virtual position data of at least one target object on the basis of position data of target objects.

For example, the auxiliary computing device 300 may acquire coordinates in the virtual reality corresponding to coordinates included in position data of the user 800 in the real world as virtual position data of a character in the virtual reality corresponding to the user 800.

The server 200 may provide at least one of the position data and the virtual position data of the target object to the auxiliary computing device 300.

As shown in FIG. 8, when the plurality of detecting devices 100 are provided in the tracking area 600, the server 200 or the auxiliary computing device 300 may acquire detecting data from the plurality of detecting devices 100, and acquire the current position data of the target object on the basis of the acquired detecting data.

In addition, the server 200 or the auxiliary computing device 300 may acquire virtual position data of at least one target object on the basis of position data of target objects.

For example, the auxiliary computing device 300 may acquire coordinates in the virtual reality corresponding to coordinates included in position data of the user 800 in the real world as virtual position data of a character in the virtual reality corresponding to the user 800.

The server 200 may provide at least one of the position data and the virtual position data of the target object to the auxiliary computing device 300.

In addition, when the server 200 is connected to a plurality of auxiliary computing devices 300, the server 200 may acquire a virtual reality image from at least one auxiliary computing device 300 among the plurality of auxiliary computing devices 300 and provide the acquired virtual reality image to the connected monitoring display device 700.

For example, the server 200 may obtain selection of auxiliary computing devices 300 from which the virtual reality image is to be acquired from among the auxiliary computing devices 300 connected to the server 200 through the server inputter 230, and may provide the virtual reality image acquired from the selected auxiliary computing device 300 to the monitoring display device 700.

In addition, the server 200 may acquire the virtual position data from the auxiliary computing device 300 and acquire a virtual reality image on the basis of the acquired virtual position data and a preset position of a virtual camera in the virtual reality.

In addition, the server 200 may provide the acquired virtual reality image to the connected monitoring display device 700.

The monitoring display device 700 may output the virtual reality image acquired from the server 200.

In addition, the input device 500 may be provided to be connected to at least one of the server 200, the auxiliary computing device 300, and the wearable display device 400.

In addition, the input device 500 may be provided with at least one marker M.

The input device 500 may be provided such that each user 800 carries the input device 500.

For example, the user 800 may carry the input device 500 in his/her hand.

According to one embodiment, the server 200 may acquire position data of the input device 500 on the basis of the detecting data acquired from the detecting device 100. In addition, the reality position data of the input device 500 may include at least one of position data or orientation direction data of the input device 500 in the tracking area 600.

The auxiliary computing device 300 may determine an orientation direction of a virtual object corresponding to the input device 500 in the virtual reality on the basis of the position data of the input device 500.

In addition, the auxiliary computing device 300 may acquire a virtual image in which the orientation direction of the virtual object corresponding to the input device 500 in the virtual reality is taken into consideration.

For example, the auxiliary computing device 300 may acquire a virtual image in which a gun corresponding to the input device 500 is oriented in a direction corresponding to an orientation direction of the input device 500 in the virtual reality.

In addition, the auxiliary computing device 300 may acquire a virtual image in which the generation of an event in accordance with an event generation command of the user 800 through the input device 500 in the virtual reality is taken into consideration.

For example, when the user 800 presses a switch provided to the input device 500, the auxiliary computing device 300 may acquire a virtual image showing that a character corresponding to the user 800 fires a gun in the virtual reality.

Figure 9:
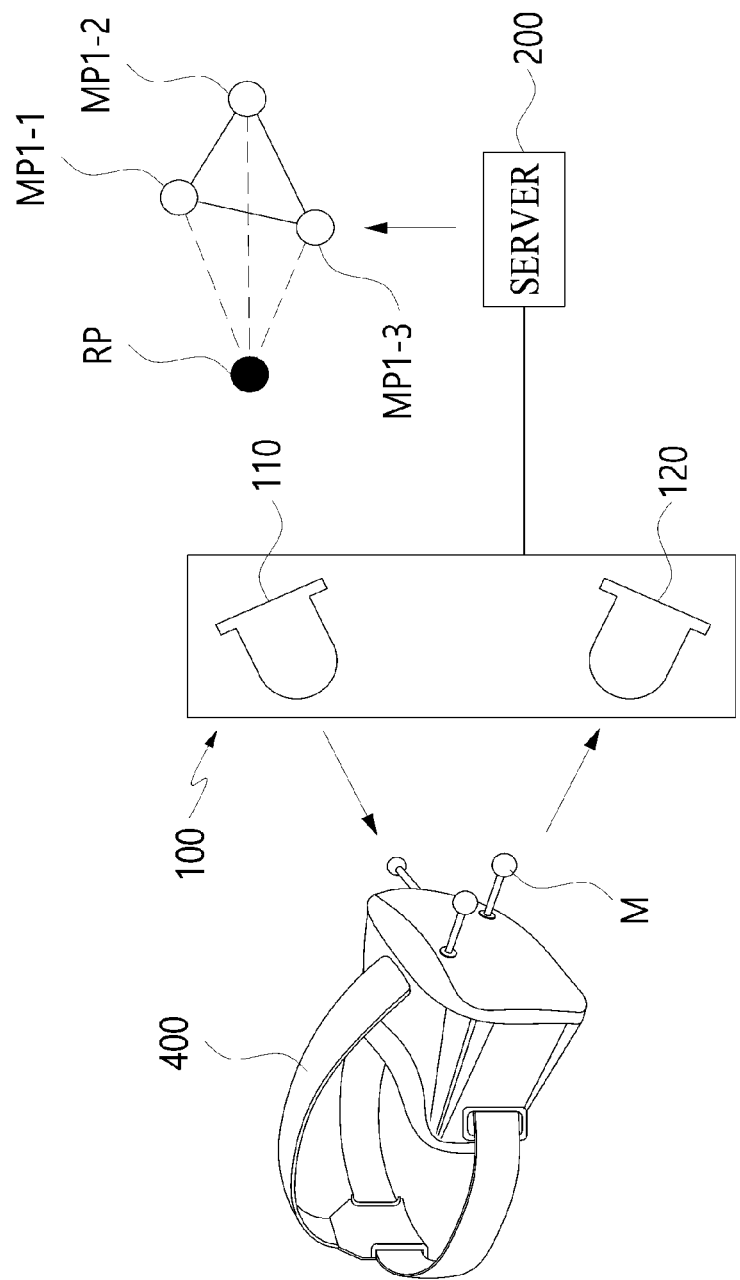
FIG. 9 is a diagram illustrating a method of tracking a target object according to one embodiment of the present disclosure.

FIG. 9 is a diagram illustrating a method of tracking a target object according to one embodiment of the present disclosure.

Referring to FIG. 9, the method of tracking a target object may acquire data related to the target object using an externally provided sensor and determine a position of the target object on the basis of the acquired data related to the target object.

Hereinafter, an example in which the target object is a wearable display device 400 will be described with reference to FIG. 9.

Referring to FIG. 9, the target object may be provided with a marker M for identifying the target object.

The marker M may be provided on the target object and serve as a reference for identifying and tracking the target object.

In order to track a target object, it is necessary to distinguish between the target object and other devices, and it may be possible to identify the target object by providing a marker M to the target object.

In addition, when a plurality of target objects are provided, it is necessary to identify each of the target objects, and to this end, a marker provided on one object may be distinguishable from another marker M provided on another object.

For example, a marker M provided on one target object may be provided in a pattern different from that of another marker M provided on another target object.

In addition, the pattern may include various types of patterns, such as a pattern formed by a plurality of marker M provided at different positions, an optical pattern provided to one display panel, and the like.

The pattern may be formed by marker coordinates of the marker M.

For example, three markers M may be tracked by the detecting device 100 so that first marker coordinates MP1-1, second marker coordinates MP1-2, and third marker coordinates MP1-3 may be acquired as detecting data, and the first marker coordinates MP1-1 to the third marker coordinates MP1-3 may form a triangular-shaped pattern.

In addition, the marker M may be provided as a passive marker, which reflects or absorbs an optical signal projected from a light emitter 110, and an active marker, which autonomously emits an optical signal.

For example, the passive marker may include a three-dimensional model with a light reflective material attached thereto, paper on which a recognizable code is printed, reflective tape, and the like.

In addition, the active marker may include an LED module, a radio wave generator, and the like.

According to one embodiment, the target object may be provided with at least one marker M.

For example, when the virtual reality control system 10 tracks a position of only one object, only one marker M may be provided on the target object.

In addition, even when the virtual reality control system 10 tracks a position of only one object, the target object may be provided with a plurality of markers M.

In addition, when the virtual reality control system 10 tracks positions of a plurality of target objects, one target object may be provided with a plurality of markers M forming a pattern in order to identify each of the plurality of target objects.

For example, when target objects whose positions are tracked by the virtual reality control system 10 are a wearable display device 400 and an input device 500, the wearable display device 400 may be provided with a marker M in a first pattern, and the input device 500 may be provided with a marker M in a second pattern.

The first pattern is different from the second pattern, and the first pattern which is detected during the position tracking may be identified as the wearable display device 400, and the second pattern detected may be identified as the input device 500.

In the above description, when a plurality of target objects are provided, the markers M provided on each of the plurality of objects are provided to form a pattern in order to identify each of the plurality of objects. However, the embodiment is not limited thereto, and even when a single target object is provided, markers M provided on the target object may be formed to form a pattern.

In addition, the pattern of the markers M provided on the target object may be used to identify the user 800.

For example, the first pattern may be identified as the wearable display device 400 worn by a first user and the second pattern may be identified as the input device 500 carried by the first user. In addition, a third pattern may be identified as a wearable display device 400 worn by a second user and a fourth pattern may be identified as an input device 500 carried by the second user.

To track the target object, a server 200 may acquire data related to the target object from the detecting device 100 and acquire detecting data related to a position of the target object on the basis of the acquired data. In addition, the server 200 may calculate the position data of the target object on the basis of the detecting data.

A description of a technique by which the detecting device 100 to provide data related to a target object to the server 200 will be given. The light emitter 110 of the detecting device 100 may project a signal to at least a part of the tracking area 600.

For example, when the light emitter 110 is an infrared LED, the light emitter 110 may project an infrared signal to at least a part of the tracking area 600.

In addition, a sensor 120 may provide data acquired from an external source to the server 200.

In one example, when the sensor 120 is a camera, the sensor 120 may provide an image signal acquired from an external source to the server 200.

Although FIG. 9 illustrates only one sensor 120, the embodiment is not limited thereto. As described in FIG. 8, a plurality of sensors 120 may be provided and each of the plurality of sensors 120 may provide acquired data to the server 200.

The server 200 may determine the position of the target object on the basis of the data acquired from the sensor 120.

The server 200 may determine whether the data acquired from the sensor 120 includes data related to a marker M. In addition, when it is determined that the data related to the marker M is included in the data acquired from the sensor 120, the server 200 may identify the target object on the basis of a pattern of the marker M.

For example, when the data acquired from the sensor 120 includes a first pattern, the server 200 may identify the target object as the wearable display device 400.

A plurality of patterns may be present in the data acquired from one sensor 120, and the server 200 may identify the plurality of patterns.

The patterns may be pre-stored in the server 200, and when the pre-stored pattern is present in the acquired data, the server 200 may determine that the corresponding pattern is present and may identify a target object corresponding to the pattern.

The server 200 may determine the position of the target object on the basis of the data acquired from the sensor 120.

Meanwhile, a representative point RP related to each of the pre-stored patterns may be set in the server 200.

The representative point RP may be a point that represents a pattern.

The representative point RP may be present outside of the pattern.

For example, the representative point RP may be set to a point spaced a predetermined distance from a plane formed by first marker coordinates MK1-1, second marker coordinates MK1-2, and third marker coordinates MK1-3.

When a pattern based on a plurality of markers M is provided, coordinate data related to the plurality of markers M included in the pattern may be acquired and the server 200 may acquire a representative point RP representing the pattern as the position data of the target object to which the pattern is provided.

Therefore, the server 200 may acquire the position data of the target object, thereby being capable of tracking the target object.

The method of tracking a position of a target object is not limited to the above examples, and various types of methods of tracking a position may be used according to selection.

According to one embodiment, when the sensor 120 is provided as an image sensor, the sensor 120 may acquire an external image and acquire position data related to the target object on the basis of the acquired image.

In one example, when the sensor 120 shown in FIG. 9 is provided to the wearable display device 400, the sensor 120 may be provided on one side of the wearable display device 400 and be oriented in an outward direction from the inside of the wearable display device 400 to acquire image data related to the outside of the wearable display device 400.

In addition, the wearable display device 400 may provide the acquired image data to the auxiliary computing device 300.

According to one embodiment, the wearable display device 400 may provide the image data to the auxiliary computing device 300 at a predetermined interval.

For example, the wearable display device 400 may provide the image data to the auxiliary computing device 300 at the same interval as that at which the image data is acquired through the sensor 120.

The auxiliary computing device 300 may acquire at least one characteristic point from the acquired image data.

According to one embodiment, the auxiliary computing device 300 may acquire an object included in the image data as the characteristic point.

According to one embodiment, the auxiliary computing device 300 may acquire an object greater than a predetermined size from among objects included in the image data as the characteristic point.

The auxiliary computing device 300 may identify the objects included in the image data and acquire an object greater than a predetermined size from among the identified objects as the characteristic point. In addition, the auxiliary computing device 300 may determine a size of the object on the basis of the number of pixels occupied by the object included in the image data.

According to one embodiment, the auxiliary computing device 300 may acquire a preset type of object from among the objects included in the image data as the characteristic point.

For example, when a ball type object is pre-set, the auxiliary computing device 300 may acquire a ball type object, such as a baseball ball, a soccer ball, a basketball ball, or the like, which is included in the image data, as the characteristic point.

According to one embodiment, the auxiliary computing device 300 may acquire a marker included in the image data as the characteristic point.

The auxiliary computing device 300 may identify a marker, such as a barcode, a quick response (QR) code, or the like, which is included in the image data, and acquire the marker as the characteristic point.

In addition, the auxiliary computing device 300 may determine a position of the characteristic point included in the image data.

The auxiliary computing device 300 may determine at least one of a position change and a size change of the characteristic point on the basis of the image data acquired from the wearable display device 400.

The auxiliary computing device 300 may determine a moving direction and a moving distance of the wearable display device 400 on the basis of a position change direction, a position variation, and a size variation of the characteristic point.

For example, the auxiliary computing device 300 may determine a position change of the characteristic point on the basis of image data acquired from the wearable display device 400.

The auxiliary computing device 300 may determine a moving direction and a moving distance of the wearable display device 400.

The auxiliary computing device 300 may determine a moving direction and a moving distance of the wearable display device 400 on the basis of a position change direction, a position variation, and a size variation of the characteristic point.

For example, the auxiliary computing device 300 may compare a position of a characteristic point included in first image data acquired at a first point in time with a position of a characteristic point included in second image data acquired at a second point in time that is later than the first point in time, and when the comparison shows that the characteristic point in the first image data is moved to the right in the second image data, may determine that the wearable display device 400 is moved to the left.

In addition, the auxiliary computing device 300 may determine a moving distance of the characteristic point when the position of the characteristic point is changed.

The auxiliary computing device may determine a moving distance of the characteristic point on the basis of the number of pixels between the position of the characteristic point in the first image data and the position of the characteristic point in the second image data.

Alternatively, the auxiliary computing device 300 may determine a moving distance of the characteristic point on the basis of coordinates of the characteristic point in the first image data and coordinates of the characteristic point in the second image data.

Also, for example, the auxiliary computing device 300 may determine a moving direction and a moving distance of the wearable display device on the basis of the size variation.

The auxiliary computing device 300 may compare a size of a characteristic point included in the first image data acquired at the first point in time with a size of a characteristic point included in the second image data acquired at the second point in time that is later than the first point in time, and when the comparison shows that the position of the characteristic point in the first image data is moved to the right in the second image data, may determine that the wearable display device 400 is moved to the left.

Accordingly, the auxiliary computing device 300 may track the position of the target object on the basis of a change in position of the target object relative to a preset initial position.

Figure 10:
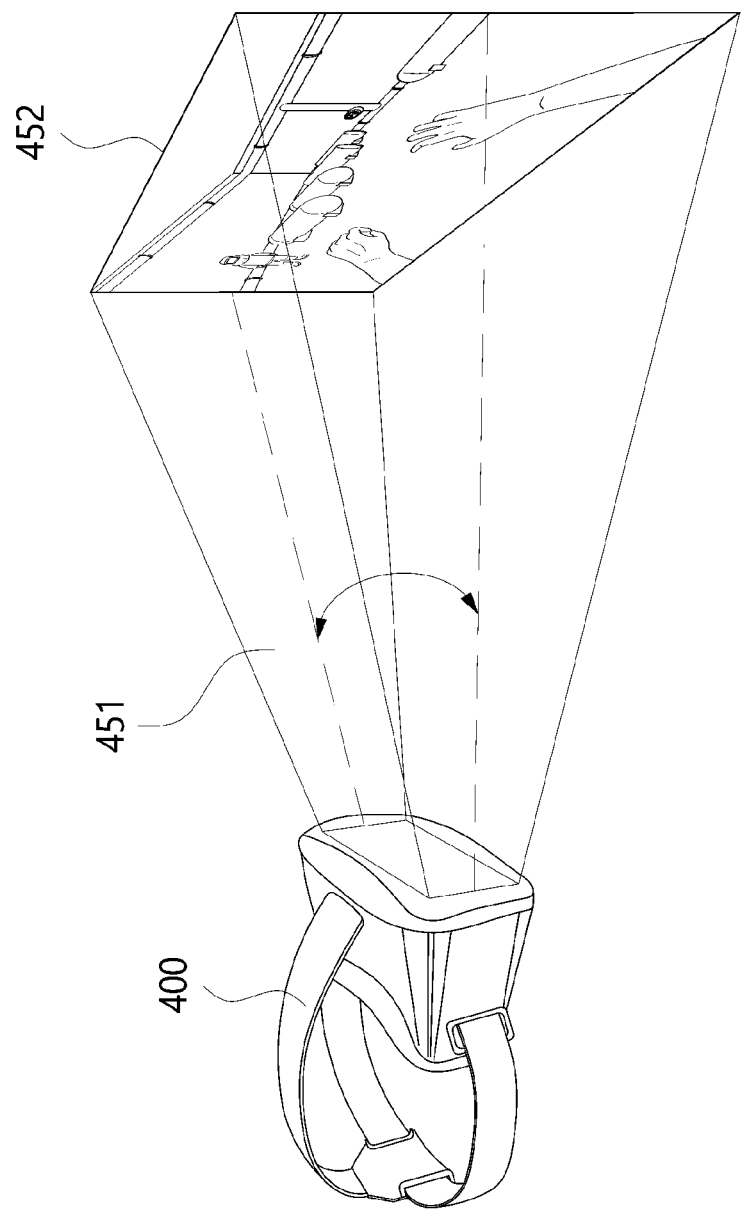
FIG. 10 is a diagram illustrating an example of outputting a virtual reality image through a wearable display device according to one embodiment of the present disclosure.

FIG. 10 is a diagram illustrating an example of outputting a virtual reality image 452 through a wearable display device 400 according to one embodiment of the present disclosure.

Referring to FIG. 10, a virtual reality control system 10 may provide a virtual reality image 452 related to at least a part of a virtual reality to a user 800 through the wearable display device 400.

Here, the virtual reality image 452 may be provided through the wearable display device 400 in order for the user 800 to experience the virtual reality, and it is noted that the virtual reality image 452 may be construed as a plurality of image frames that are implemented as images related to a virtual reality or may be construed as an image frame of a specific moment.

The virtual reality image 452 may include a character or a virtual object which is displayed on the basis of virtual position data. In this case, the virtual position data may be calculated on the basis of position data including at least one of position coordinates and an orientation direction of a target object in the real world. For example, the position data may be position coordinates of the target object located in a tracking area 600.

A server 200 may pre-store a coordinate value related to the tracking area 600.

The server 200 may pre-store a coordinate system related to the tracking area 600. The coordinate system may be at least one of a plane coordinate system, an orthogonal coordinate system, a polar coordinate system, a spatial coordinate system, a cylindrical coordinate system, and a spherical coordinate system.

The server 200 may acquire a coordinate value of the target object in the tracking area 600 on the basis of detecting data and the coordinate system related to the tracking area 600. In addition, the server 200 may acquire the acquired coordinate value of the target object in the tracking area 600 as position data.

In one example, when the detecting data is an infrared image, the server 200 may acquire a coordinate value of the marker in the tracking area 600 on the basis of a position of the marker corresponding to the target object in the infrared image and an installation position of the detecting device 100 that has provided the infrared image. In addition, the server 200 may determine a pattern formed by the marker on the basis of the coordinate value of the marker in the tracking area 600 and identify a target object corresponding to the pattern formed by the marker. In addition, the server 200 may acquire a representative point RP of the target object on the basis of the pattern formed by the marker and the coordinate value of the marker in the tracking area 600, and acquire a coordinate value of the representative point RP of the target object as position data of the target object.

The server 200 may provide the position data to the auxiliary computing device 300.

The auxiliary computing device 300 may pre-store a coordinate value related to a virtual reality.

The auxiliary computing device 300 may pre-store a coordinate system related to the virtual reality. The coordinate system may be at least one of a plane coordinate system, an orthogonal coordinate system, a polar coordinate system, a spatial coordinate system, a cylindrical coordinate system, and a spherical coordinate system.

The auxiliary computing device 300 may acquire a coordinate value of a target object in the virtual reality on the basis of the position data and the coordinate system related to the virtual reality.

For example, the auxiliary computing device 300 may acquire a coordinate value in the virtual reality corresponding to a coordinate value included in the reality position data and acquire the acquired coordinate value in the virtual reality as virtual position data.

The auxiliary computing device 300 may acquire the virtual reality image 452 to be output to the user 800 on the basis of the virtual position data.

According to one embodiment, the auxiliary computing device 300 may acquire virtual position data of the wearable display device 400 as virtual position data of a virtual camera and acquire a field of view 451 of the virtual camera on the basis of the virtual position data of the virtual camera and an orientation direction of the virtual camera.

The auxiliary computing device 300 may acquire the orientation direction of the virtual camera on the basis of an orientation direction included in the position data of the wearable display device 400.

In addition, the auxiliary computing device 300 may acquire a predetermined area in the orientation direction of the virtual camera as the field of view 451 of the virtual camera.

As such, by acquiring the field of view 451 of the virtual camera on the basis of the position data of the wearable display device 400, a visual field of the character that corresponds to the user 800 in the real world may be changed according to the movement of the user 800, and the change may be reflected in the virtual reality image 452 to be provided to the user 800.

Meanwhile, the field of view 451 of the virtual camera may be acquired on the basis of specific virtual position data in the virtual reality, as well as the virtual position data of the wearable display device 400.

In addition, the auxiliary computing device 300 may acquire the virtual reality image 452 corresponding to the field of view 451 of the virtual camera in the virtual reality.

The auxiliary computing device 300 may provide the virtual reality image 452 to the wearable display device 400.

The wearable display device 400 may output the acquired virtual reality image 452 to the user 800 through the wearable display screen outputter 450.

Hereinafter, disaster training content that a virtual reality control system 10 according to one embodiment of the present disclosure provides to a user 800 as part of a virtual experience will be described with reference to FIGS. 11 and 12.

Figure 11:
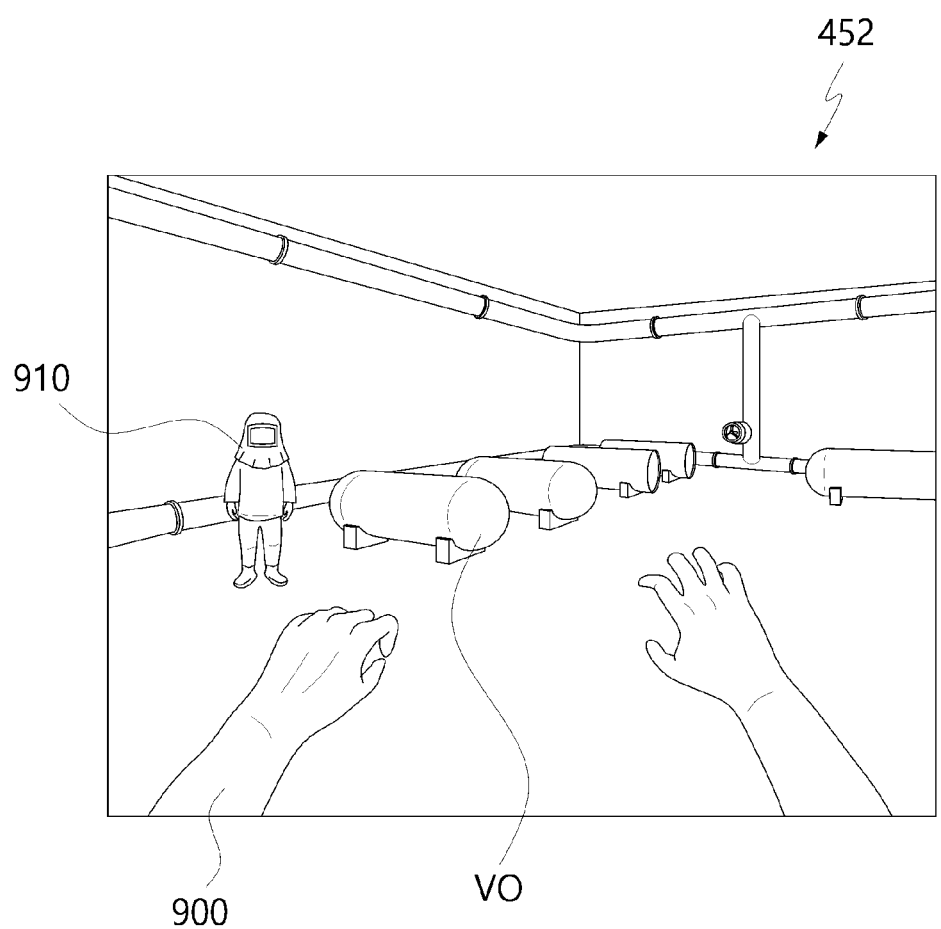
FIG. 11 is a diagram illustrating a virtual reality image according to one embodiment of the present disclosure.

FIG. 11 is a diagram illustrating a virtual reality image 452 according to one embodiment of the present disclosure.

Figure 12:
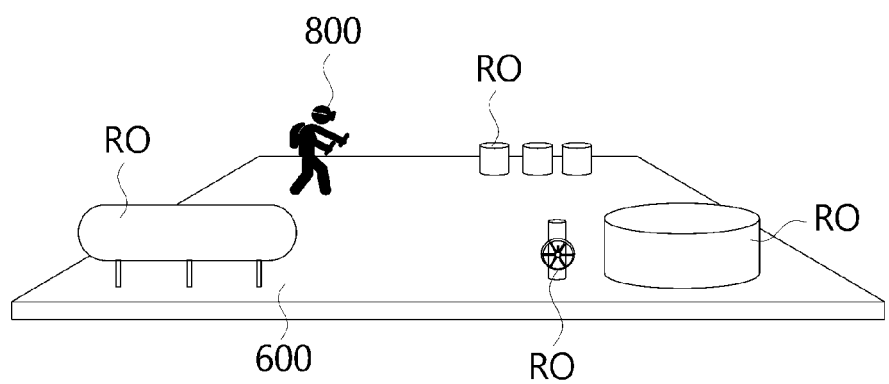
FIG. 12 is a diagram illustrating real objects RO which are disposed in a tracking area according to one embodiment of the present disclosure.

FIG. 12 is a diagram illustrating real objects RO which are disposed in a tracking area 600 according to one embodiment of the present disclosure.

Referring to FIG. 11, the virtual reality control system 10 may provide the user 800 with content related to disaster training.

Here, disaster training content may include content related to how to prepare for a disaster in advance so as to respond to an event, accident, and problematic situation that may occur in reality. For example, the disaster training content may include training content to respond to a chemical accident that may occur in a factory dealing with chemicals. Accordingly, the user 800 may prepare for a disaster in reality by experiencing the disaster in virtual reality and having substantial training.

Referring back to FIG. 11, the virtual reality control system 10 may provide a virtual reality image 452 related to disaster training in order to provide disaster training content to the user 800.

Here, the virtual reality image 452 may include the background and terrain related to a disaster, a character 900, a peer character 910, and a virtual object VO.

Here, the background and terrain related to a disaster may include terrain features and objects to represent the disaster. For example, in a case in which the disaster is a chemical accident in a chemical plant, the virtual reality image 452 may include factory facilities and chemical facilities, such as vertical/horizontal piping, valves, storage tanks, pumps, or safety equipment.

Here, the character 900 may refer to a character in a virtual reality corresponding to the user 800. For example, the character 900 may be generated on the basis of virtual position data obtained by tracking movement of the user 800 and may move to correspond to a motion of the user 800.

Here, the peer character 910 may include a non-player character (NPC) provided by a pre-stored application or program and characters corresponding to other users excluding the user 800. Specifically, the disaster training content provided by the virtual reality control system 10 may be provided to a plurality of users. In this case, the plurality of users may cooperate with each other and experience a disaster in the virtual reality, and the character 900 that moves in the virtual reality according to the movement of the user 800 and the peer character 910 that corresponds to the movement of another user excluding the user 800 may be provided.

Here, the virtual object VO may be realized in the virtual reality and can be used by the character and may include tools, equipment, facilities, and the like. For example, the virtual object VO may include a hand of the user character 900 and equipment, mechanical equipment, or the like carried by the user character 900 in the virtual reality corresponding to an input device 500 carried by the user 800 in the real world. In another example, the virtual object VO may include a valve, a spanner, a measurer, and the like to control chemical facilities and equipment in the disaster training content.

The virtual object VO may be provided by an application of a program pre-stored in an auxiliary computing device 300. Here, the virtual object VO may be generated on the basis of object data pre-stored in the auxiliary computing device 300 or on the basis of the real object RO in the real world.

Referring to FIG. 12, the virtual reality control system 10 may provide the user 800 with the tracking area 600 including the real objects RO in order to display the virtual object VO in the virtual reality.

Here, the real object RO may vary in form or shape depending on content provided to the user 800 by the virtual reality control system 10. For example, where the virtual reality control system 10 provides the user 800 with disaster training content related to an accident in a factory, the real object RO may include factory facilities and chemical facilities, such as vertical/horizontal piping, valves, storage tanks, pumps, safety equipment, or the like. Meanwhile, the real object RO does not necessarily have a similar form to the virtual object VO provided in the virtual reality. For example, in a case in which the real object RO includes a characteristic point or a marker so that size data, position data, or function data of the real object RO is provided to a detecting device 100, a server 200, or the auxiliary computing device 300, the real object RO may have a different form from that of the virtual object VO that is generated on the basis of the real object RO. However, in a case in which space is allowed in the tracking area 600, the real object RO may have a similar form and shape to the virtual object VO, and in this case, tactile sensation may be provided to the user 800 to improve a sense of immersion of the user 800 in the virtual reality.

The real object RO may include a simulator that executes a preset function automatically or by manipulation of the user 800. For example, when the user 800 who is experiencing the virtual reality applies a force in the tracking area according to the progress of the content, the real object RO may rotate or move to a different position and may provide relevant information to the server 200 or the auxiliary computing device 300. Alternatively, the detecting device 100 may monitor a position change or occurrence of rotation of the real object RO and provide relevant information to the server 200 or the auxiliary computing device 300.

Figure 13:
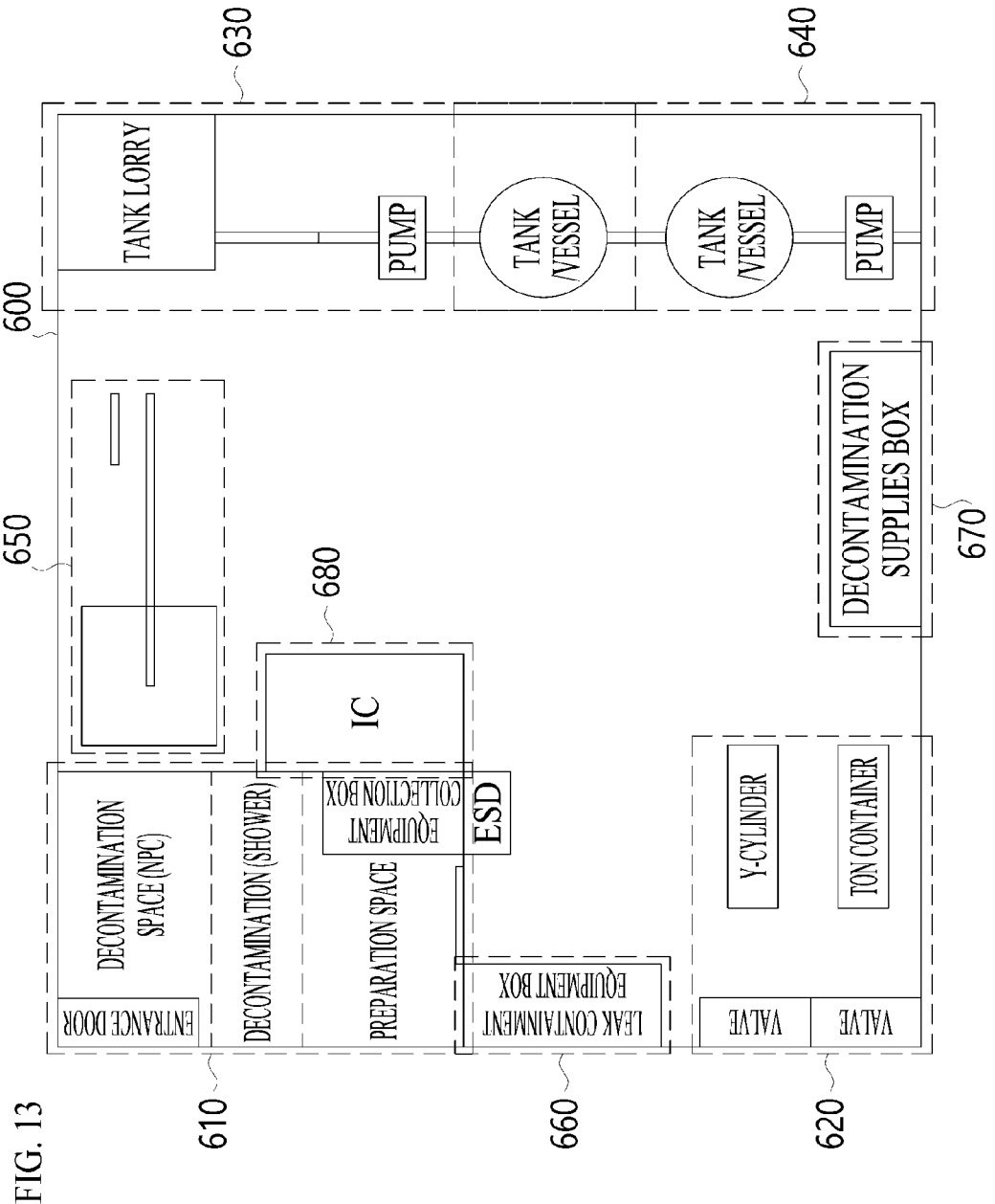
FIG. 13 is a diagram illustrating a tracking area according to one embodiment.

FIG. 13 is a diagram illustrating a tracking area according to one embodiment.

Referring to FIG. 13, a tracking area 600 according to one embodiment may include a plurality of areas.

The tracking area 600 may include a decontamination area 610, a chlorine filling area 620, a first storage area 630, a second storage area 640, a chlorine storage area 650, a leak containment equipment box 660, a decontamination supplies box 670, and a field command area 680.

Each of the areas may be an area consisting of real objects RO, an area consisting of virtual objects VO, or an area consisting of combinations of RO and VO. When each of the areas is an area consisting of RO or VO, each area may be larger than the area occupied by the RO or VO. The control system 1000, the server 200, or the auxiliary computing device 300 may set each area to be larger than the area occupied by the RO or the VO, thereby more accurately evaluating an action of a user located near the object in each area.

The decontamination area 610 may be set to a position near an entrance door of a training area. The decontamination area 610 may be divided into a decontamination space decontaminated by an NPC and a decontamination space decontaminated through chemical shower. A preparation space may be located near the decontamination area. An equipment collection box may be disposed in the preparation space. A virtual display may be installed in the preparation space and the user may receive an instruction of a training supervisor through the virtual display.

The chlorine filling area 620 may include a Y-cylinder, a ton container, and a plurality of valves. The first storage area 630 may include a tank, a pump, and a tank lorry. The second storage area 640 may include a plurality of tanks and a pump. The first storage area 630 and the second storage area 640 may share one tank. The tank shared by the first storage area 630 and the second storage area 640 may have a discharge wall installed therein.

A plurality of equipment may be positioned in the leak containment equipment box 660. Each of the equipment may be a real object or a virtual object.

The field command area 680 may be positioned in the central area of the tracking area 600 where each of the areas can be viewed. The field command area 680 may be an area for a field commander.

The field command area 680 may be divided from other areas by virtual objects or real objects.

A user with the highest authority among a plurality of users may be positioned in the field command area 680. That is, the user assigned the authority of a field command may be induced to enter the field command area 680.

When the field commander is located in the field command area 680, an image corresponding to the field of view of the field manager may be output to a wearable display device. When a user who is not the field command is located in the field command area 680, the image corresponding to the field of view may not be output. Alternatively, it may be informed through the wearable device that the user has entered an unauthorized area. In this case, the wearable device worn by the user who is not the field commander may output an image of low resolution, a warning notification, or a warning sound.

That is, when the first user may have a first authority, a second user may have a second authority, and the first authority is higher than the second authority, only the first user is allowed to enter the field command area 680. When the first user is located in the field command area 680, an image corresponding to the field of view may be output, and when the second user is located in the field command area 680, a notification image may be output or an image that is not the image corresponding to the field of view may be output.

When the second user is located in the field command area 680, the controller may confirm the first user whether to transfer the field command authority to the second user. When the first user confirms the transfer of the field command authority, the second user becomes the field commander and the image corresponding to the field of view may be output. When the second user who does not have the field commander authority is located in the field command area 680 without moving for a predetermined period of time, the controller may confirm the first user whether to transfer the field command authority.

Alternatively, when the authority of the field commander is removed during the training process, a team leader of a team in an area closest to the field command area 680 may be automatically assigned the field commander authority. Or a user located in an area nearest the field command area 680 may be automatically assigned the field commander authority.

The field command area 680 may be displayed only to a person who has the field commander authority. The entrance door of the field command area 680 may be displayed only to the person who has the field command authority and may not be displayed to those who do not have the field command authority.

The field command area 680 may control opening or closing of the entrance door depending on whether the user has the field command authority. For example, when a user has the field commander authority enters within a predetermined distance from the entrance door of the field command area 680, the controller may control the entrance door of the field command area 680 to open. Even when a user who does not have the field command authority is located within an area close to the field command area 680, the entrance door may be controlled not to open.

The authority of the field commander may be assigned to one of the users in advance. Alternatively, a user who first enters the field command area 680 after the training starts may be assigned the field commander authority.

FIGS. 14 to 17 are diagrams illustrating movement lines in accordance with a training scenario according to one embodiment.

Figure 14:
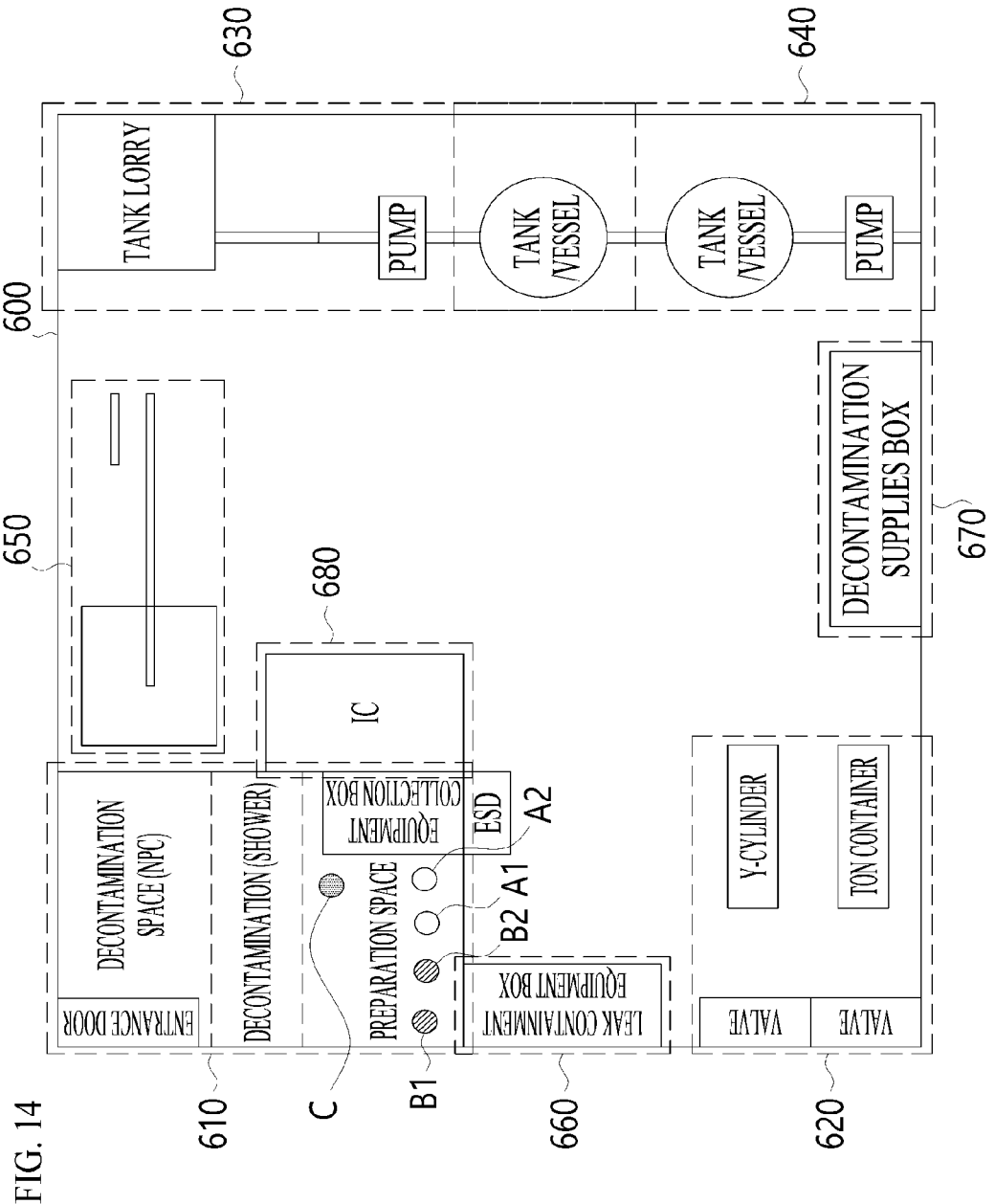
FIGS. 14 to 17 are diagrams illustrating movement lines in accordance with a training scenario according to one embodiment.

Referring to FIG. 14, five users may participate in the training scenario. The five users may be classified into one field commander C, team A (A1 and A2), and team B (B1 and B2).

The field commander C, the team A (A1 and A2), and the team B (B1 and B2) may be located in a decontamination area 610. The field commander C, the team A (A1 and A2), and the team B (B2 and B2) may perform decontamination in the decontamination area and be on standby in a preparation space. Situation information may be provided through a display installed in the preparation space. When a situation is reported, a controller may induce the users to wear a protection suit.

In this case, a color of the protection suit may differ from one team to another, and the shape of the protection suit of the field commander may be different compared to those of team members.

Figure 15:
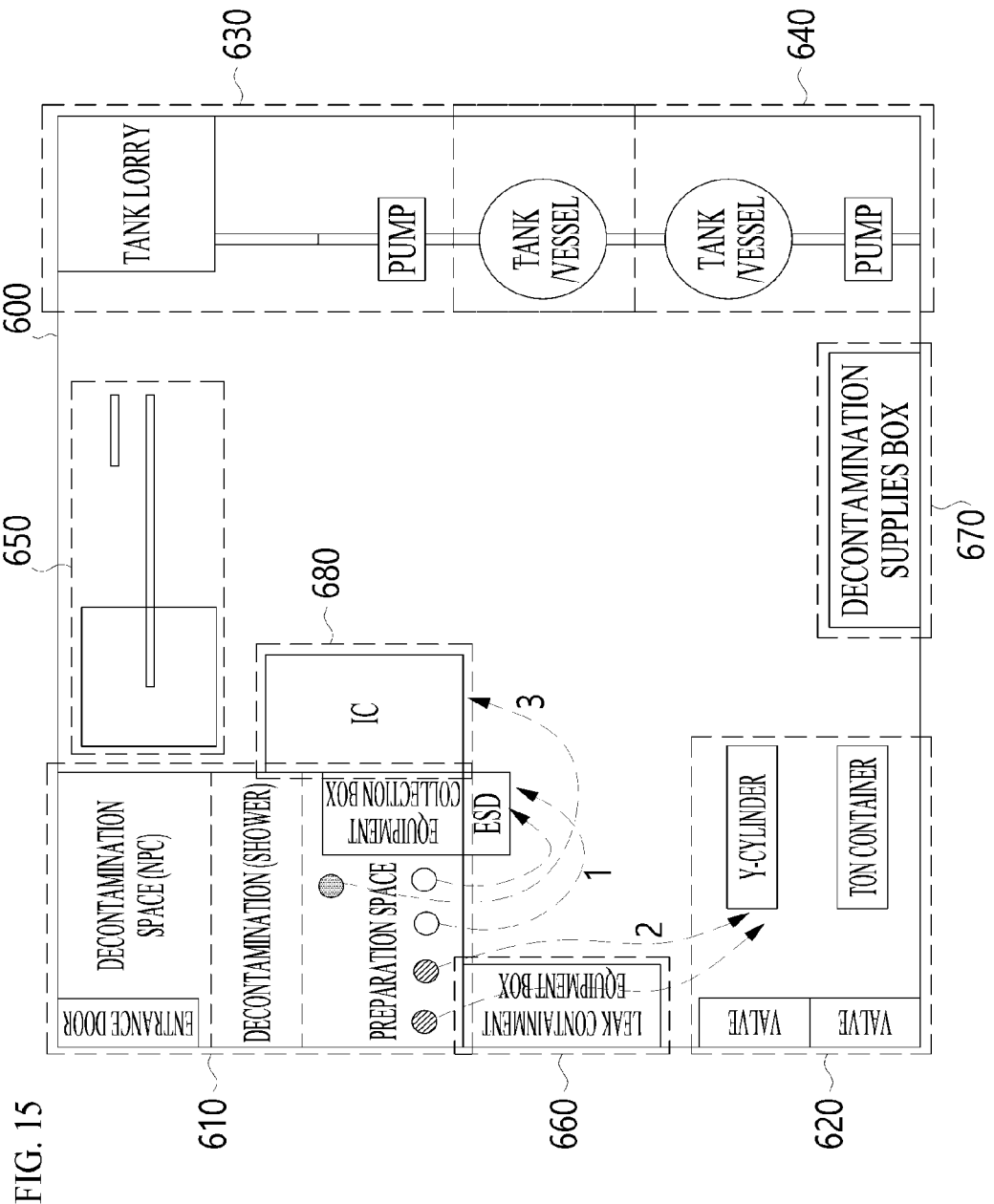

Referring to FIG. 15, the team A (A and A2) may be induced to move an area close to an emergency shut down (ESD) area and the team B (B1 and B2) may be induced to move to a chlorine filling area 620.

The field commander C may be induced to move to a field command area 680.

When a situation occurs, a destination may be displayed in a wearable display of each of the users in the preparation space. The destination may be represented by an arrow in a virtual space to direct each of the users to the destination.

Alternatively, after a situation occurs, each of the destinations may be displayed in the preparation space after the command of the field commander C is made. For example, when the field commander C inputs a voice input through a microphone to order the team A to execute ESD, an ESD area may be displayed in the wearable display devices worn by the users of the team A. In addition, when the field commander C inputs a voice input through the microphone to order the team B to check a leaking spot, the chlorine filling area 620 may be displayed in the wearable display devices worn by the users of the team B.

Even with the command of the field commander C, timings of displaying the destinations for the team A and the team B may be separate. For example, even when the field commander C continuously orders commands, a destination may be displayed in the wearable display device of each of the users in the team A and the team B at a time interval. Alternatively, the destinations for the users in the team B may be displayed based on the moving status of the team A.

Accordingly, it is possible to prevent movement lines of the users from overlapping, thereby preventing physical contact between the users.

A path to the destination may be displayed in the wearable display device of each of the users. The wearable display device of each user may display the path for the user to move on the ground of a tracking area. When another user is present around the path for the user to move, the user may be informed of the presence of another user and be prevented from physical contact.

When another user is present around the path for the user to move, a color of the displayed path on the ground may be changed or an arrow may be added to another user displayed through the wearable display device. In this case, as a distance between the user and another user becomes shorter, a larger warning notification may be output.

The field commander C may be induced to move after the team A (A1 and A2) and the team B (B1 and B2) have completed their movement.

The team A (A1 and A2) may be induced to move to the ESD area and attempt ESD. When the ESD is successfully performed, the situation is closed. When the field commander C receives a report of failure of ESD, the movement of the team B (B1 and B2) may be induced. When the last moved user of the team B (B1 and B2) has moved away from the decontamination area 610 by more than a predetermined distance, the movement of the field commander C may be induced.

The controller may induce the team B (B1 and B2) to check a leaking spot of the Y-cylinder.

Figure 16:
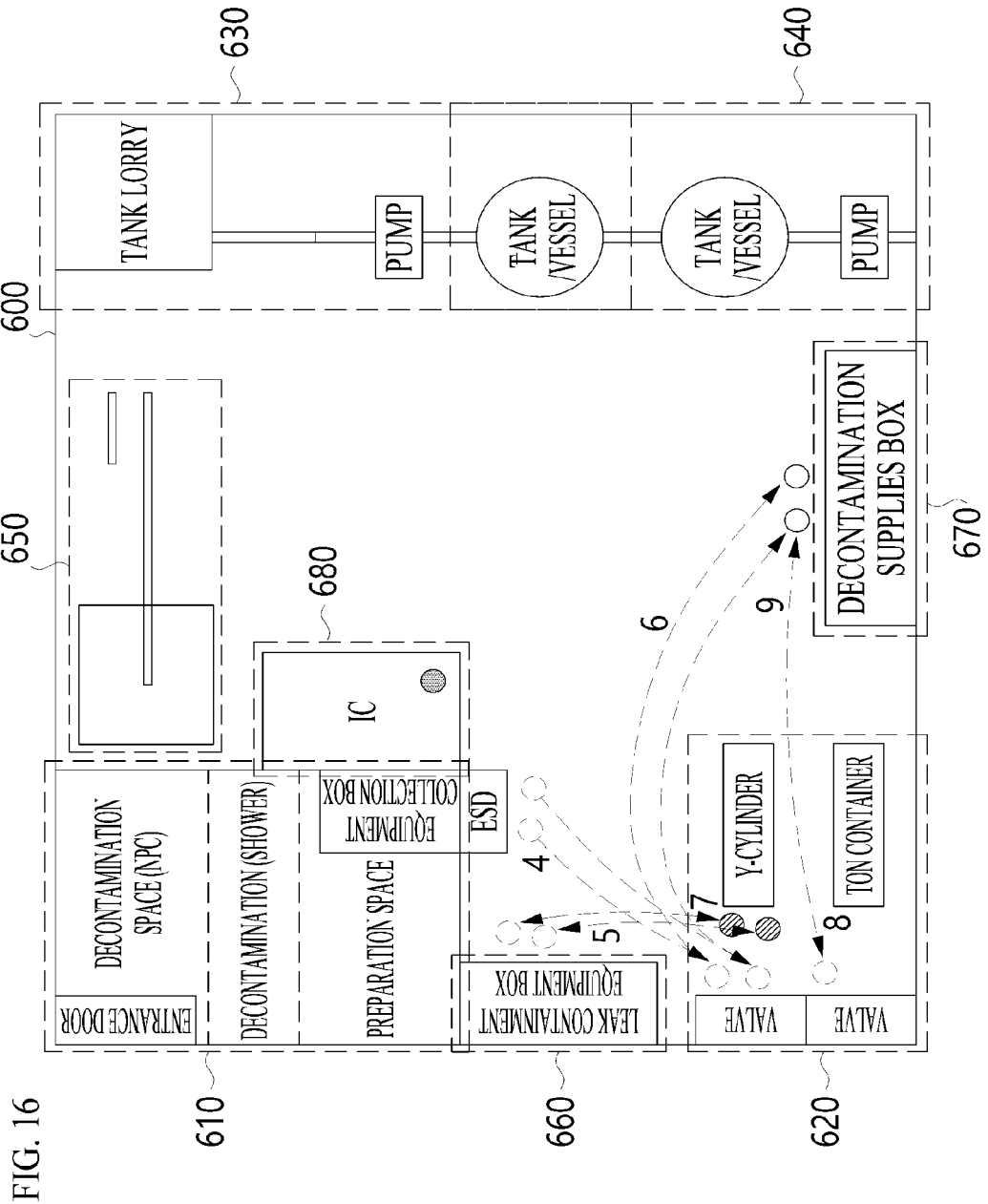

Referring to FIG. 16, the team A (A1 and A2) may be induced to move to the chlorine filling area 620. The team A (A1 and A2) that has moved to the chlorine filling area 620 may be induced to close a piping valve.

After the movement of the team A (A1 and A2) to the chlorine filling area 620 is completed, the team B (B1 and B2) may be induced to move to a leak containment equipment box 660. Once the movement of the team B (B1 and B2) to the leak containment equipment box 660 is completed, the team A may be induced to move to a decontamination supplies box 670.

When the movement of the team A to the decontamination supplies box 670 is completed, the team B may be induced to move back to the chlorine filling area 620 and proceed with leak containment process using equipment selected from the leak containment equipment box 660.

The controller may add an unexpected event which is preset or is assigned by a supervisor. For example, when an unexpected event is added, one member of the team A may be induced to move to the valve, close the valve, and move back to the decontamination supplies box 670.

Figure 17:
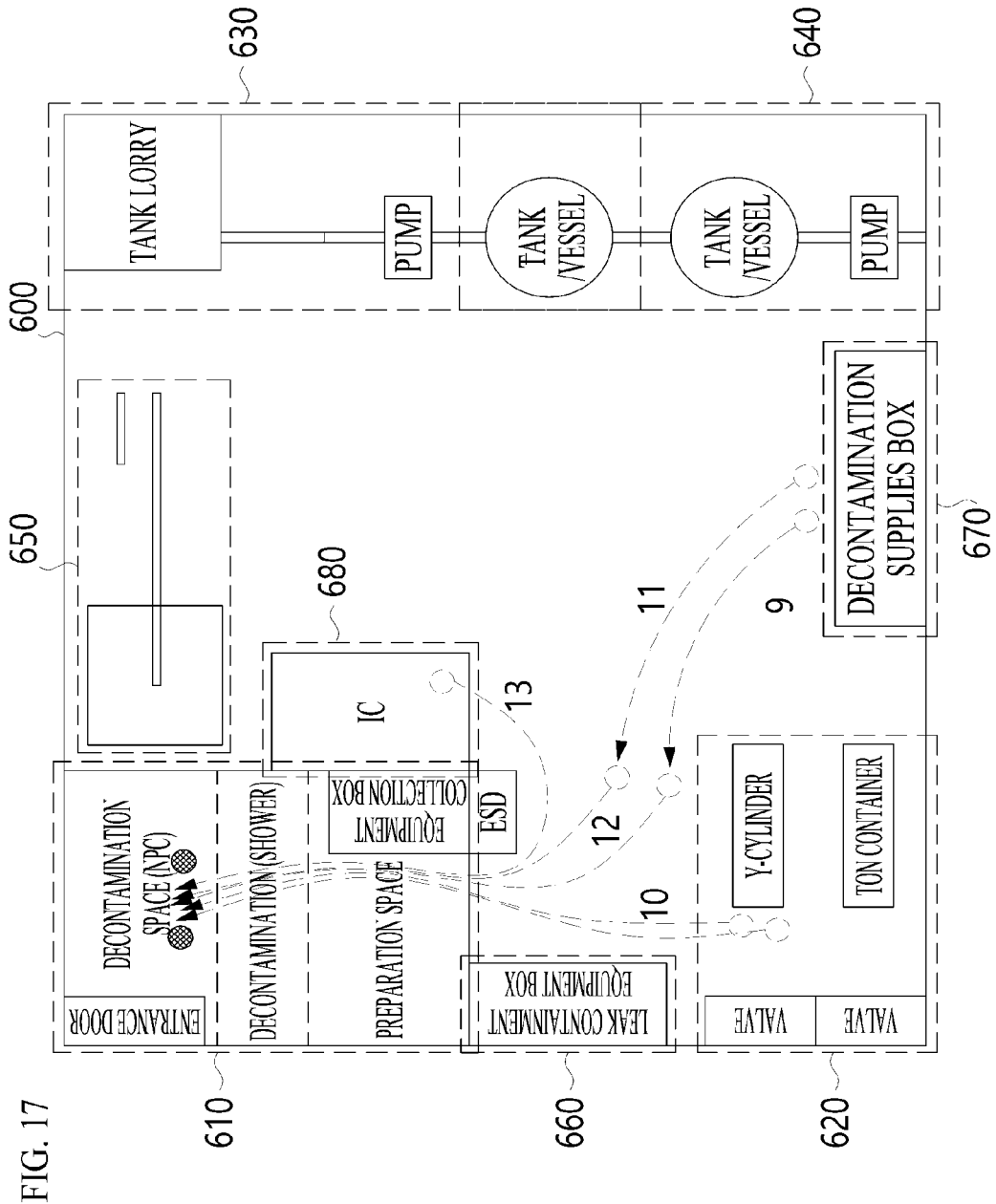

Referring to FIG. 17, when the field commander C inputs an order to withdraw through a microphone, the team B may be induced to move to the decontamination area 610. When the movement of the team B is completed, the team A is induced to spray after confirmation of slacked lime and thereafter may be induced to move to the decontamination area 610. When the movement of the team A to the decontamination area 610 is completed, the field commander C is also induced to move to the decontamination area 610, and when the movement of the field commander C and decontamination are completed, the situation is terminated.

The simultaneous movements of the teams in the training scenario may be restricted. That is, when one team is in motion, the other team is induced to remain in a stationary state, thereby preventing a physical collision between the users.

In addition, a role in one team may be allocated based on a distance to an object for performing the role. For example, when one person needs to close the valve, a role may be given to a user who is closest to the valve in the team, and when a distance from the users to the object is the same, the role may be given according to a preset order. In addition, display of a path to the destination within the same team may be set to prevent the movement lines of the users from overlapping. In other words, when there is one team member, the shortest path to the destination may be displayed, but when there are several team members, paths to the destinations may be displayed as curved lines to prevent the movement lines from overlapping.

The virtual reality control system according to the embodiments can provide a system that assigns different roles to the users according to their authorities in chemical accident response training content, thereby improving training proficiency of the users.

A number of example embodiments have been described above. Nevertheless, it should be understood that various modifications may be made to these example embodiments. For example, suitable results may be achieved when the described techniques are performed in a different order and/or when components in a described system, architecture, device, or circuit are combined in a different manner and/or replaced or supplemented by other components or their equivalents.

REFERENCE NUMERALS

10: VIRTUAL REALITY CONTROL SYSTEM
100: DETECTING DEVICE
200: SERVER
300: AUXILIARY COMPUTING DEVICE
400: WEARABLE DISPLAY DEVICE
500: INPUT DEVICE

What is claimed is:
1. A virtual reality control system comprising:
a sensor configured to emit and receive light on and from a target object and detect a light signal;
a first display configured to output a first image to a first user;
a second display configured to output a second image to a second user; and
at least one controller configured to control at least one of the first display and the second display, wherein the controller is configured to acquire first position data related to the first user and second position data related to the second user based on the light signal, and output an image including a first area and a second area to the first display based on the first position data, wherein the controller assigns a first authority to the first user and a second authority to the second user when the first user is located in the first area prior to the second user, wherein the first authority is a higher authority than the second authority, wherein the first image is output to the first display when the first positon data is located in the first area, and a notification image is output to the second display when the second positon data is located in the first area, wherein the controller checks with the first user whether to transfer the first authority to the second user when the second user having the second authority is located in the first area without moving for a predetermined period, wherein the controller controls the first display to display a moving path of the first user toward a destination and the second display to display a moving path of the second user toward a destination, wherein the controller controls the second display to display the moving path of the second user after movement of the first user is completed, wherein the controller controls the second display to change a color of the moving path of the second user when the first user is located adjacent the moving path of the second user, wherein evaluation is performed with a different evaluation item according to the first authority and the second authority.

2. The virtual reality control system of claim 1, wherein the notification image is not an image that corresponds to a field of view of the second user.

3. The virtual reality control system of claim 1, wherein if the second user has the first authority transferred by the first user, an image that corresponds to a field of view of the second user is output to the second display when the second position data is located in the first area.

4. The virtual reality control system of claim 1, wherein the first authority and the second authority are preset authorities.

5. The virtual reality control system of claim 1, wherein a simulation is executed with a different scenario according to the first authority and the second authority.

6. The virtual reality control system of claim 1, wherein the second display and the moving path of the second user is not the shortest distance.

* * * * *